E. OVERTON.
Water-Wheels.

No. 142,862.  Patented September 16, 1873.

Witnesses:
A. Beyneckendorf.
C. Sedgwick

Inventor:
E. Overton
Per Munn & Co.
Attorneys.

A.M. PHOTO-LITHOGRAPHIC CO. N.Y. (OSBORNE'S PROCESS)

UNITED STATES PATENT OFFICE.

ELI OVERTON, OF UTICA, NEW YORK.

IMPROVEMENT IN WATER-WHEELS.

Specification forming part of Letters Patent No. 142,862, dated September 16, 1873; application filed July 26, 1873.

*To all whom it may concern:*

Be it known that I, ELI OVERTON, of Utica, in the county of Oneida and State of New York, have invented a new and Improved Water-Wheel, of which the following is a specification:

The invention consists in the improvement of water-wheels, as hereinafter described and pointed out in the claims.

Figure 1:
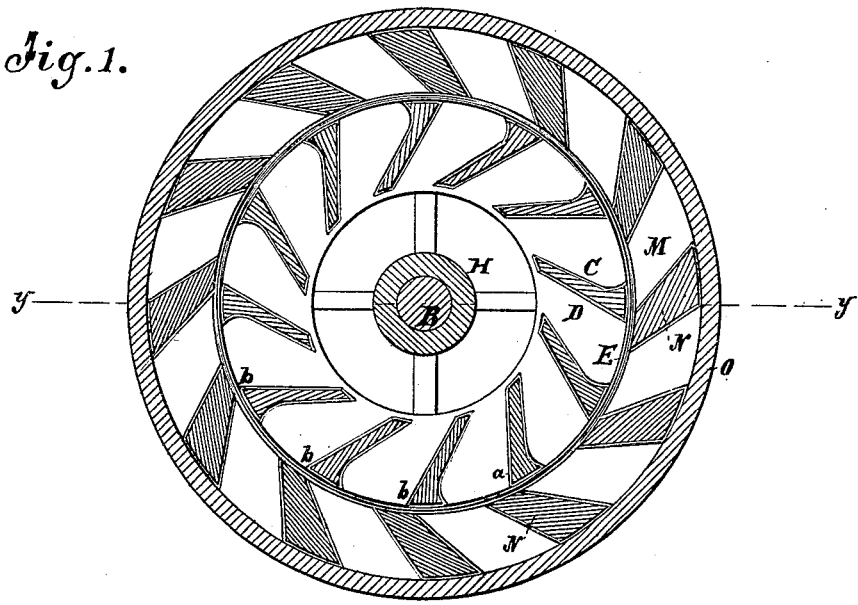
Figure 2:
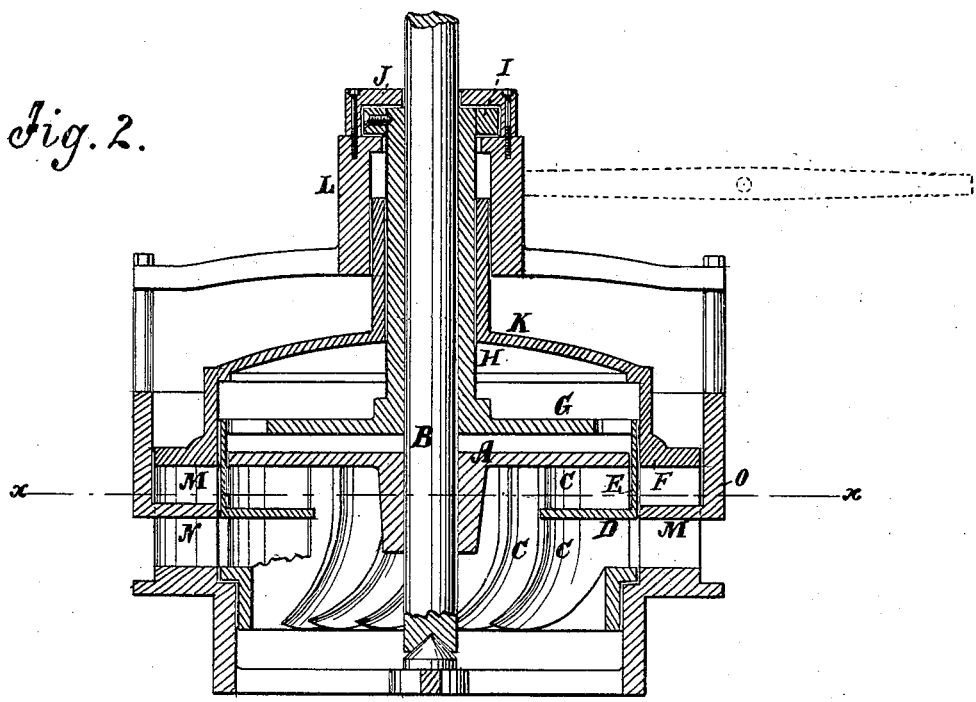

Figure 1 is a horizontal sectional elevation of my improved wheel taken on the line $x\,x$ of Fig. 2, and Fig. 2 is a transverse sectional elevation taken on the line $y\,y$ of Fig. 1.

Similar letters of reference indicate corresponding parts.

A is the top of the wheel, B the shaft, and C the buckets. D represents the gages for regulating the capacity of the buckets according to the volume of water to be used. They consist of horizontal plates, constructed in the form of the cross-section of the space between the upper or vertical portions of the buckets, and they are attached to the lower end of the curb E surrounding the upper portion of the wheel, and extending above it and the upper wall F of the chutes as high as the gages D may require to be lowered, and attached to a disk plate or frame G, which is supported on a sleeve, H, which is connected, by a collar, I, and cap J, with the sleeve L of the cap O. M represents the gages for the chutes N. They are attached to the curb O, which is the gate to be raised and lowered by it, and thus be adjusted as readily as the gate is. The gate O, being connected by its sleeve L with the sleeve H, to which the gages D are connected, both the wheel and the chute gages will be adjusted together and alike, and at the same time that the gate is opened, so that the labor of adjusting the wheel-gages separately to the different heights as the stream varies, or as the labor to be performed by the wheel varies, will be avoided. The ordinary curb O and the curb E, which I employ in connection with the wheel-gages, comprise a double gate, by which the wheel is closed more effectually than it can be by one gate only, and thus much waste is prevented. But the outer gate O may be dispensed with, if desired, as the curb E will answer alone for a gate.

I propose to continue the buckets on the front side on a straight line, $a$, to the curvature at the periphery, and thus produce knife-edges $b$ to cut any pieces of wood or other like matters entering the buckets from the chutes, and save the clogging and stopping of the wheel, now common, by such objects in the water.

Having thus described my invention, I claim as new and desire to secure by Letters Patent—

1. The combination of the adjustable chute-gages M and wheel-gages D in a water-wheel, when connected together substantially as specified.

2. A, curb E, for the support of the wheel-gages D, adapted to form, in connection with the gate O, a double gate, substantially as specified.

ELI OVERTON.

Witnesses:
WILLIAM H. PRATT,
WILLIAM R. ANTHONY.